United States Patent [19]

Hansen et al.

[11] 3,970,908
[45] July 20, 1976

[54] A.C. MOTOR STARTING SYSTEM

[75] Inventors: James E. Hansen, Oak Creek; Eugene R. Schmit, Elm Grove, both of Wis.

[73] Assignee: Cutler-Hammer, Inc., Milwaukee, Wis.

[22] Filed: Dec. 9, 1974

[21] Appl. No.: 530,768

[52] U.S. Cl. ............................ 318/221 E; 318/227; 318/221 G
[51] Int. Cl.² .......................................... H02P 1/44
[58] Field of Search ........ 318/229 R, 221 E, 221 G, 318/227

[56] References Cited
UNITED STATES PATENTS

| | | | |
|---|---|---|---|
| 3,766,457 | 10/1973 | Fink, Jr. et al. | 318/221 E |
| 3,842,327 | 10/1974 | Wexler | 318/221 E |

*Primary Examiner*—Gene Z. Rubinson
*Attorney, Agent, or Firm*—Hugh R. Rather; William A. Autio

[57] ABSTRACT

A single-phase induction motor is provided with a simple capacitor-start control system. A precision current detector (reed relay) is used in the main winding circuit to fire a bidirectional thyristor and precisely control the starting and stopping points of energization of the start winding to cause the motor to accelerate to the desired speed. Although this small reed relay is a fast acting device that picks up on the leading side and drops out on the trailing side of each current half-cycle, chopping up of the current wave is avoided by the combination used. Thus, in view of the nearly 90 degree phase-shift between the main winding and start winding currents, the reed relay, with its dropout point being lower in current value than its pickup point on each half-cycle due to the inherent differential in its magnetic characteristics, applies a wide firing pulse to the thyristor at the most desirable time, that is, it widely overlaps the point where the start winding current passes through zero. Thus, the thyristor is force-fired at the beginning of each half-cycle for symmetrical triggering. And since the thyristor conducts for the remainder of each half-cycle, this start winding thyristor affords full-cycle conduction even though the reed switch itself is not closed throughout each half-cycle of main winding current thereby avoiding chopping up of the start winding current wave. In addition, this combination avoids hysteresis in that the current value at which the reed relay starts picking up on consecutive half-cycles and the lower current value at which it stops picking up on consecutive half-cycles are very close to one another thereby affording accurate control of the start winding.

7 Claims, 4 Drawing Figures

A.C. MOTOR STARTING SYSTEM

BACKGROUND OF THE INVENTION

Capacitor-start single-phase induction motor control systems have been known heretofore. However, these prior systems have been subject to one or more disadvantages such as presence of hysteresis where ordinary electromagnetic relays are used for switching the start winding circuit making the pickup and dropout points hard to control, contact bounce creating electrical noise, bulkier requiring more mounting space, affected by temperature and other environmental factors, more subject to wear and deterioration, complex in number of parts and operation and adjustment, more costly, more connections to motor, require internal power supplies, inability to withstand sustained locked rotor conditions, and lack of sensitivity. While these prior systems have been useful for their intended purpose, this invention relates to improvements thereover.

SUMMARY OF THE INVENTION

This invention relates to A.C. motor starting systems and more particularly to capacitor-start systems for single-phase induction motors.

An object of the invention is to provide an improved capacitor-start system for an A.C. motor.

A more specific object of the invention is to provide a simple and effective control system for the start winding of a single-phase induction motor.

Another specific object of the invention is to provide an improved precision control system affording accurate control of motor start winding energization and de-energization points with respect to motor speed.

Another specific object of the invention is to provide a single-phase induction motor with an improved substantially static start winding control system that is small in size and accurate in operation.

Another specific object of the invention is to provide an improved capacitor-start control system for a single-phase induction motor that affords precise control and full-cycle condition of the start winding current.

Other objects and advantages of the invention will hereinafter appear.

DESCRIPTION OF THE PREFERRED EMBODIMENT

Figure 1:
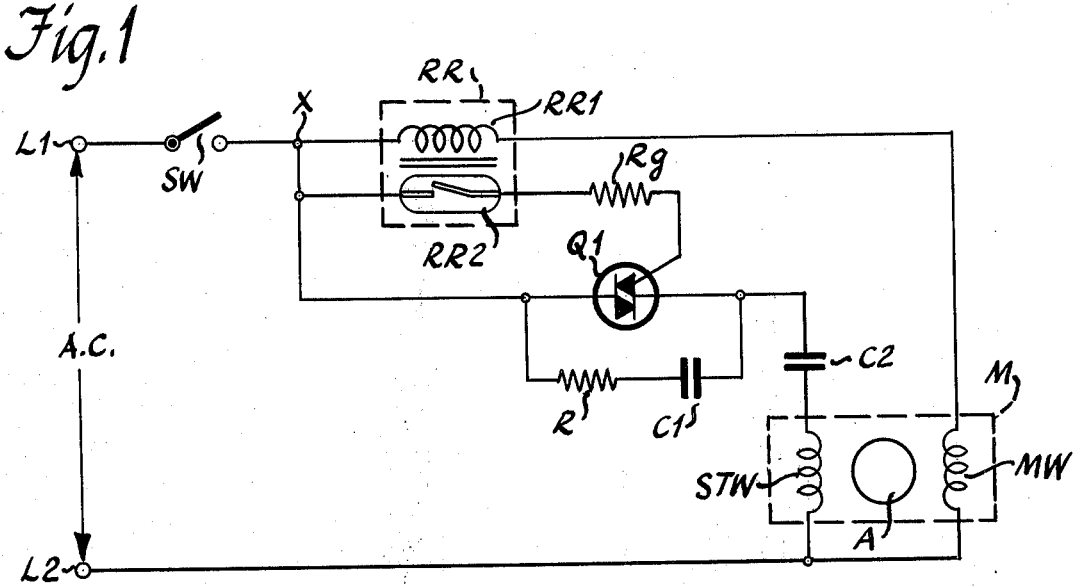
FIG. 1 diagrammatically illustrates a capacitor-start induction-run control system for a single-phase induction motor constructed in accordance with the invention.

Referring to the drawings, there is shown a circuit diagram of a capacitor-start control system for a single-phase induction motor M. This motor comprises a rotor or armature A, a main field winding MW and a start field winding STW. The system is powered from an alternating current source A.C. connectable to power supply lines L1 and L2. An on-off switch SW is connected to line L1.

The capacitor-start control system comprises a precision current detector such as a reed relay RR, a gating-type semiconductor means such as a bidirectional thyristor or Triac Q1, along with its small capacitor C1 and resistor R connected in series thereacross and a gate resistor Rg, and a phase-shift capacitor C2 of large size. As shown in the drawing, line L1 is connected through normally-open switch SW, operating coil RR1 of reed relay RR and main winding MW of the motor to line L1. This main winding is known also as the run winding of the motor.

Also in this capacitor-start system, junction X between switch SW and coil RR1 is connected through the main conduction path anodes of Triac Q1, large capacitor C2, and start winding STW of the motor to line L2. This same junction X is also connected through the reed switch or normally-open contacts RR2 of the reed relay and gate resistor Rg to the gate of Triac Q1. A dv/dt circuit comprising resistor R and small capacitor C1 in series is connected across the anodes of the Triac to slow down the rate of change of voltage thereacross thereby to prevent unwanted triggering of this Triac. Gate resistor Rg provides some current limiting to the gate to help prevent reed welding under certain conditions.

A typical single-phase, capacitor-start induction motor includes in addition to the armature or rotor assembly, sometimes referred to as a squirrel cage, and field winding, also called a run winding, an extra field winding that is used only in starting the motor. This is called a start winding. Its purpose is to provide a phase-shifted magnetic field with respect to the run winding magnetic field which, working together, provide a rotating magnetic field that induces a high starting torque on the rotor.

Figure 2:
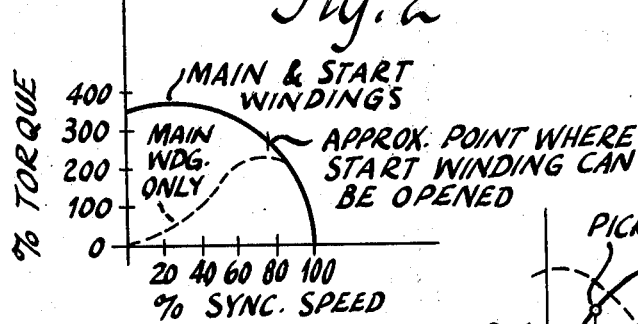
FIG. 2, 3 and 4 graphically depict operating characteristics of the system of FIG. 1.

The curves in FIG. 2 show how effective a start winding can be. That is, the main winding and start winding together produce a much higher starting torque as shown by the solid line than can be obtained by the main winding alone as shown by the broken line. Once the rotor approaches synchronous speed, the start winding can be de-energized and the run winding left energized alone, the motor action now being that of a normal single-phase induction motor.

A typical system uses a centrifugal force switch. This switch is normally closed to energize the start winding. This switch is coupled to the rotor so that centrifugal force of rotation will cause the switch to open when the rotor RPM has attained a desired value.

There is also another means of sensing when the start winding circuit should be opened, such as sensing the current flowing in the run winding circuit. When the motor is first accelerating from zero speed, the initial run winding current is typically several times higher than what it decreases to at running speed. Thus, for specific load conditions, run winding current can be used to correlate to speed and can be sensed to open the start winding circuit at the desired speed level.

Such a current sensing system, designed properly, offers advantages over centrifugal switches with respect to mechanical complexity, space required, remote mounting, and limited switch mechanical and electrical life.

This current sensing has been used in FIG. 1. The circuit is very simple and strightforward. A Triac device is used as the switch for the start winding. It in turn is commutated by the small reed relay that is used as a precision current sensor. Although these two have been known heretofore, nevertheless when they are combined with the phase-shifting capacitor and the run and start windings, a unique combination results as will hereinafter appear.

Figure 3:
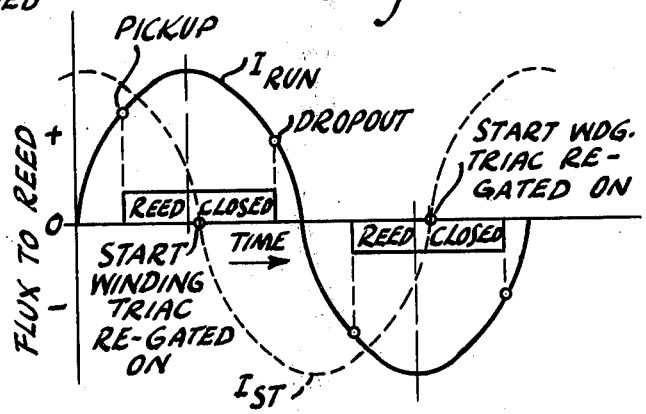

FIG. 3 shows what happens when a large run winding current flows such as during initial start-up. As shown therein, the reed relay picks up on the leading side of each half-cycle of run winding current $I_{run}$ and drops out on the trailing side of each such half-cycle. A small coil operated reed switch is fast enough to do this and, thus, is a precise current sensor. The dropout point is at a lower current value than the pickup point due to the inherent magnetic characteristics of the reed. This characteristic will be used to advantage. Thus, the reed switch is closed through a wide range overlapping the center point of each run winding current half-cycle.

One would expect this to provide pulses of current to the start winding, that is, to chop up the current, but that is not the case. The reason for this is that the start winding current leads the run winding current by almost 90 degrees as shown in FIG. 3. Therefore, the reed switch closure widely overlaps the point where the start winding current passes through zero. As a result, the Triac is fired into conduction at the beginning of each start winding current half-cycle. And since the Triac inherently continues to conduct until its anode current approaches zero, the start winding is energized throughout each half-cycle and there is no chopping up of the current wave.

Figure 4:
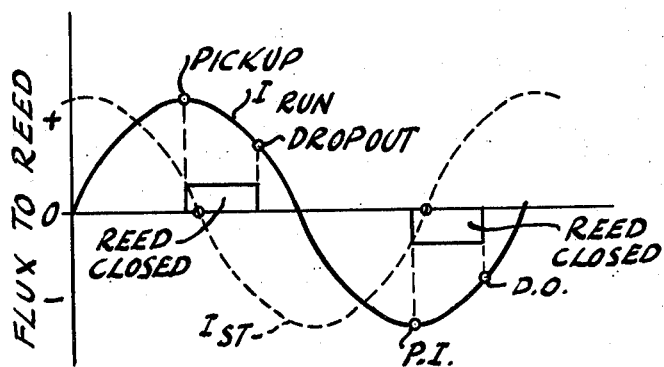

As illustrated in FIG. 4, it will be apparent that the reed relay, being a precision current sensor device, has a critical current amplitude at and above which it will pick up. When the run winding current decreases below this critical amplitude as the motor reaches the desired running speed, the reed switch will stop picking up. This, of course, means that the start winding will be deenergized and the point with respect to run winding current amplitude at which this happens can be accurately controlled.

However, at the run winding current amplitude slightly above this critical value as shown in FIG. 4, the reed relay will pick up on each half-cycle and will produce appreciable closure time due to the differential of pickup and dropout produced by the aforementioned magnetic characteristics. And this closure time will overlap the point where the start winding current wave passes through zero thereby to afford good control of the start winding with a very simple and economical circuit.

The reed has a long mechanical life. Thus, although it closes and opens at a fast rate during the motor starting time, once the motor is running, it no longer closes; thus there is no more wear. The accelerating time in most applications is very short, less than one second.

This reed relay remains a precision current sensor even over temperature ranges. Thus, the reed relay mmf (magnetomotive force) does not change even if the coil temperature and its resistance change since the mmf is proportional to amperes times turns of the coil and, therefore, is independent of coil resistance. Also, this reed relay has no metal core structure to change its characteristics is in an electromechanical relay device.

The reed closes symmetrically on positive and negative half-cycles. This is very important as any dissymmetry could produce a condition where D.C. components would be introduced into the motor, thus causing braking.

The performance of this system is not dependent on Triac gate characteristics such as gate sensitivity as in other systems that use a voltage threshold to determine the firing point. This is because of the low impedance of the gate-anode circuit whereby the Triac is force-fired into conduction at the start of each half-cycle. Thus, there is no requirement for Triac selection. In view of this, temperature changes affecting Triac gate characteristics do not affect the performance of this system. In other systems using Triacs, these characteristics and lack of symmetry can be a big problem.

Moreover, this system is capable of withstanding sustained locked rotor current without any damage to the sensor. This is because you can overdrive a reed without damage in that, once closed, additional mmf won't hurt it. Also, it has only a few turns and very low resistance so that the wattage dissipation in the coil is not great.

While the system hereinbefore described is effectively adapted to fulfill the objects stated, it is to be understood that the invention is not intended to be confined to the particular preferred embodiment of A.C. motor starting system disclosed, inasmuch as it is susceptible of various modifications without departing from the scope of the appended claims.

We claim:

1. An A.C. motor starting system supplied from an alternating current source for controlling a motor having a rotor, a run field winding and a start field winding including means for shifting the phase of the start field winding with respect to the run field winding to provide a rotating magnetic field for starting, comprising:

a precision current sensor having an operating coil and a contact;

means applying alternating current from the alternating current source to said operating coil;

said main field winding being connected in circuit with said operating coil to also receive alternating current from the alternating current source;

said precision current sensor including means making it responsive to and fast enough to pick up on the leading side of each half-cycle of alternating current and to drop out on the trailing side of each half-cycle thereof, and having a critical current amplitude at and above which it will pick up on increasing alternating current and below which it will stop picking up on decreasing alternating current;

a bidirectional thyristor having main electrodes and a control electrode with said main electrodes being connected in circuit with the start field winding and its phase-shifting means across the alternating current source;

and means connecting said contact between one side of the alternating current source and said control electrode whereby upon application of power to the system said operating coil responds to the main field winding current to operate said contact and apply a firing current to said control electrode for a substantial time range during each half-cycle of the run field winding current, which substantially overlaps, due to phase-shift, the point where the start field winding current passes through zero, thus to insure refiring of said thyristor at the beginning of each half-cycle of its current, and said operating coil stops the closing of said contact at said critical level of the decreasing main field winding current as the motor approaches its running speed, thus to discontinue energization of the start field winding at a precisely controllable point.

2. An A.C. motor starting system as claimed in claim 1, wherein:

said precision current sensor having an operating coil and a contact is a small reed relay capable of fast operation and accurately sensing the current level and normally operating to close its contact on the leading slope of each half-cycle of run field winding current and to reopen its contact on the trailing slope of each such half-cycle.

3. An A.C. motor starting system as claimed in claim 1, wherein:

said bidirectional thyristor is a Triac capable of sustaining conduction, after it has been fired into conduction, for the remainder of each half-cycle of start field winding current.

4. An A.C. motor system comprising:

an alternating current source;

an A.C. motor having a rotor, a run winding and a start winding including means for shifting the phase of said start winding with respect to said run winding to provide a rotating magnetic field for motor starting;

power supply lines connected to said alternating current source;

a precision current sensor having sensing means and switching means;

circuit means applying alternating current from said alternating current source to said sensing means;

said run winding being connected in series with said sensing means to also receive alternating current from said alternating current source in a first circuit whereby said sensing means is caused to respond to accurately controlled levels of run winding current on each said half-cycle thereof, being fast enough to respond and operate said switching means on the leading side of each half-cycle of alternating current and to restore said switching means on the trailing side of each half-cycle thereof, and having a critical current level at and above which it will operate on increasing current and below which it will fail to operate on each half-cycle of decreasing current;

a gating-type semiconductor means having main electrodes and a control electrode with said main electrodes connected in series with said start winding and its phase-shifting means in a second circuit to control energization of said start winding;

means connecting said switching means to the control electrode of said gating-type semiconductor means in a third circuit for controlling firing of said semiconductor means into conduction;

control means including said circuit means for connecting one of said power supply lines to said first, second and third circuits in parallel at first ends thereof and for connecting the other ends of said first and second circuits to the other power supply line.

5. The A.C. motor control system claimed in claim 4, wherein:

said phase-shifting means is a large capacitor for shifting the phase of said start winding almost 90 degrees.

6. The A.C. motor control system claimed in claim 4, wherein:

said gating type semi-conductor means is a bidirectional thyristor means that when gated into conduction in either direction will conduct for the remainder of each half-cycle of the current applied thereto.

7. The A.C. motor control system claimed in claim 4, wherein:

said precision current sensor is a small reed relay having a coil for sensing the run winding current and a normally-open contact serving as said switching means.

* * * * *